United States Patent [19]
Deschaine et al.

[11] Patent Number: 5,901,024
[45] Date of Patent: May 4, 1999

[54] APPARATUS AND METHOD FOR CIRCUIT PROTECTION

[75] Inventors: Stephen A. Deschaine, Garland; Mark J. Nietubyc, Plano; Werner L. Heissenhuber; Henry K. Lee, both of Carrollton; Mark W. Berry, Sunnyvale, all of Tex.

[73] Assignee: Alcatel USA Sourcing, L.P., Plano, Tex.

[21] Appl. No.: 08/773,267

[22] Filed: Dec. 23, 1996

[51] Int. Cl.$^6$ ...................................................... H02H 3/00
[52] U.S. Cl. .................................. 361/67; 370/228; 307/39
[58] Field of Search .................................. 361/62, 63, 64, 361/67; 379/412; 340/651, 653, 825.01, 825.18, 825.16, 827; 324/415–424; 307/38, 39, 139–140, 125–126, 130–131, 132 E, 85–86; 370/225–228

[56] References Cited

U.S. PATENT DOCUMENTS

| | | | |
|---|---|---|---|
| 4,656,645 | 4/1987 | Kaneko | 375/267 |
| 5,014,261 | 5/1991 | Shinbashi et al. | 370/228 |
| 5,069,521 | 12/1991 | Hardwick | 385/24 |
| 5,506,833 | 4/1996 | Nemoto | 370/228 |

*Primary Examiner*—Jeffrey Gaffin
*Assistant Examiner*—Michael J. Sherry
*Attorney, Agent, or Firm*—Baker & Botts, L.L.P.

[57] ABSTRACT

Apparatus for redundancy circuit protection includes a controller (20), a plurality of circuits (22) coupled to the controller (20), and a redundancy switch (50) coupled between the plurality of circuits (22) and a network. The redundancy switch (50) is adapted for connecting or disconnecting selected ones of the plurality of circuits (22) to or from the network. In addition, a predetermined number of spare circuits (52) with similar functionality as the plurality of circuits (22) are coupled to the high density bank control unit (20), so that the redundancy switch (50) may connect or disconnect selected ones of the predetermined number of spare circuits (52) to the network and establish a transmission path from the controller (20) through the selected spare circuits (52) to the network.

28 Claims, 5 Drawing Sheets

APPARATUS AND METHOD FOR CIRCUIT PROTECTION

TECHNICAL FIELD OF THE INVENTION

This invention is related in general to the field of telecommunications systems. More particularly, the invention is related to apparatus and method for circuit protection.

BACKGROUND OF THE INVENTION

Usage and demand for modern telecommunication systems continue to soar as users demand more sophisticated communication services and bandwidth while relying on the instant availability of these communication systems. Increasingly, communication systems are used to provide all types of information including voice, video, and data.

Modern telecommunications networks include a number of components, such as subscriber loop equipment that communicate, manipulate, and process information in a variety of ways. The subscriber loop equipment connect the telecommunications service customers to the central office, so that their calls may be processed and routed. As with other components of the telecommunications network, the requirement for reliability and fault tolerance is also applicable to the subscriber loop equipment.

SUMMARY OF THE INVENTION

Accordingly, there is a need for apparatus and method for circuit protection that provides multiple layers of redundancy to circuits and also "sparing of the spare" for added assurances.

In one aspect of the invention, apparatus for redundancy circuit protection includes a controller, a plurality of circuits coupled to the controller, and a redundancy switch coupled between the plurality of circuits and a network. The redundancy switch is adapted for connecting or disconnecting selected ones of the plurality of circuits to or from the network. In addition, a predetermined number of spare circuits with similar functionality as the plurality of circuits are coupled to the controller, so that the redundancy switch may connect or disconnect selected ones of the predetermined number of spare circuits to the network and establish a transmission path from the controller through the selected spare circuits to the network.

In another aspect of the invention, a circuit protection scheme includes the steps of providing multiple spare circuits coupled to a redundancy switch, which connects a plurality of circuits to a network in a first position and connects selected ones of the spare circuits to the network in a second position. In response to detecting a failure in a circuit, the redundant switch is switched to the second position to connect one of the spare circuits to the network in place of the failed circuit. Subsequent failures detected in other circuits prompts the redundant switch to switch to the second position and connecting another one of the spare circuits to the network in place of the failed circuit. The spare circuits may be switched in place of additional failed circuits until no spare circuits are available.

In yet another aspect of the invention, a circuit protection scheme includes the steps of providing multiple spare circuits coupled to a redundancy switch, which connects a plurality of circuits to a network in a first position and connects selected ones of the spare circuits to the network in a second position. In response to detecting a failure in a circuit, the redundant switch is switched to the second position to connect one of the spare circuits to the network in place of the failed circuit. Subsequent failures detected in the spare circuit functioning in place of the failed circuit prompts the redundant switch to switch to the second position and connecting another one of the spare circuits to the network in place of the failed spare circuit. The spare circuits may be switched in place of failed circuit and/or spare circuits until no spare circuits are available.

BRIEF DESCRIPTION OF THE DRAWINGS

For a better understanding of the present invention, reference may be made to the accompanying drawings, in which.

DETAILED DESCRIPTION OF THE INVENTION

Figure 1:
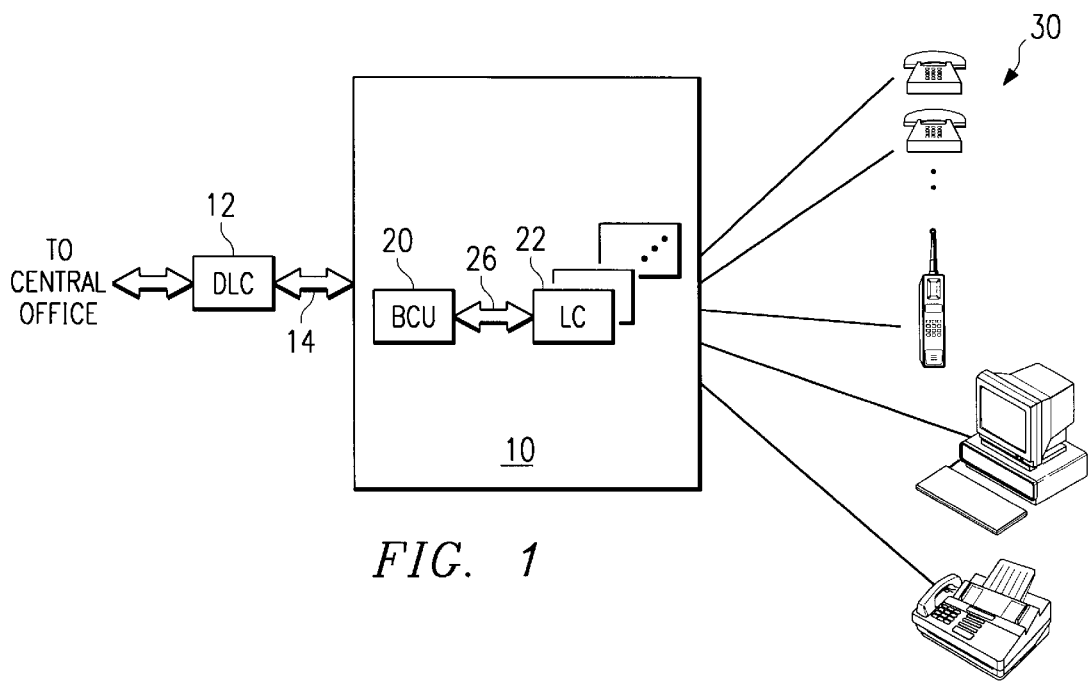
FIG. 1 is a top level block diagram of an exemplary channel bank constructed according to the teachings of the present invention.

The preferred embodiment(s) of the present invention is (are) illustrated in FIGS. 1–10, like reference numerals being used to refer to like and corresponding parts of the various drawings.

Referring to FIG. 1, a channel bank 10 constructed according to the teachings of the present invention is shown. Channel bank 10 is coupled to a digital loop carrier (DLC) 12 through a data and control message link 14. Digital loop carrier 12 may be in communications with equipment residing in a central office (not shown), such as a central office terminal of the digital loop carrier and a digital cross-connect system.

Channel bank 10 is a DS0 to DS1 or DS0 to E1 multiplexing equipment primarily used for, but not limited to, analog voice to pulse code modulation (PCM) conversion and multiplexing. Channel bank 10 includes a high density bank control unit (BCU) 20, which may be coupled to more than one line cards(LC) 22 via a subscriber bus 26. Line cards 22 may operate at DS1 and DS3 rates, as well as international rates such as E1 and include multiple network interfaces per line card. A mixture of different types of line cards may populate channel bank 10. A plurality of subscriber equipment 30, such as telephones, computers, fax machines, etc. may be coupled to each line card 22.

Figure 2:
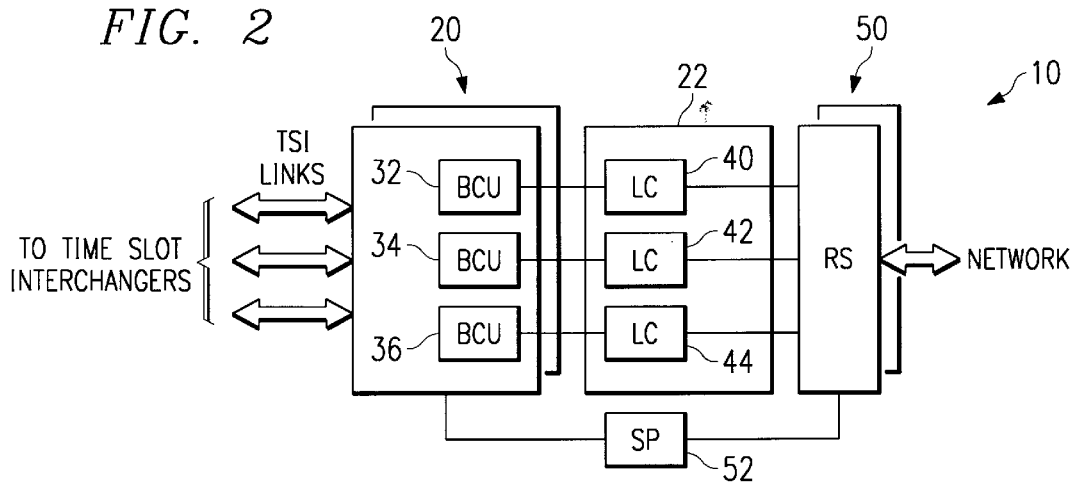
FIG. 2 is a more detailed block diagram of an embodiment of a channel bank according to the teachings of the present invention.

Referring to FIG. 2, additional details of channel bank 10 is shown. Line cards 22 may be divided into multiple protection groups 40–44 which are coupled to logically partitioned bank control units 32–36 and a redundancy switch (RS) 50. Multiple spare line cards 52 are coupled between bank control units 32–36 and redundancy switch 50. Note that high density bank control unit 20 and redundancy switch 50 each also include a redundant plane as backup. Each bank control unit 32–36 is coupled to time slot interchangers (not shown) in digital loop carrier 12 via a time slot interchanger (TSI) link. Time slot interchanger link is preferably a sequentially byte-interleaved bus transporting 64 time slots or DS0 signals onto which signals received from line cards 22 are logically mapped.

Figure 3:
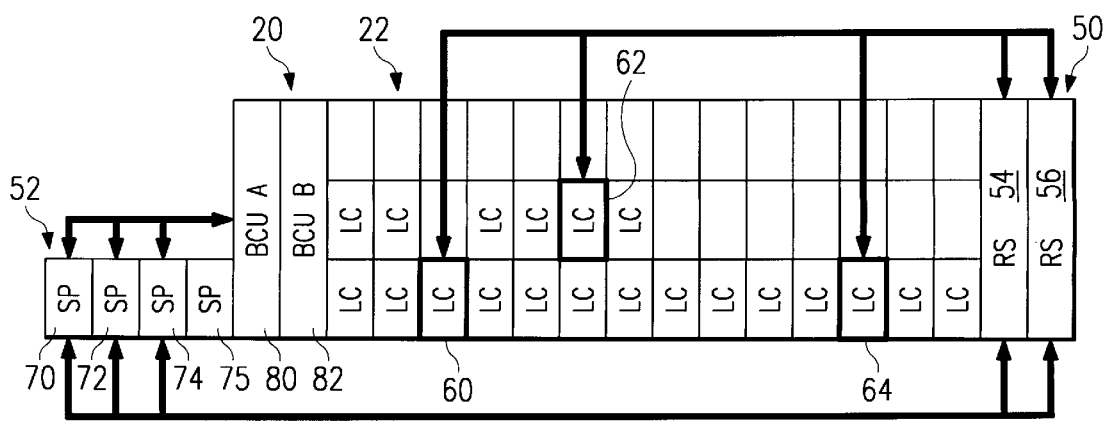
FIG. 3 is an exemplary block diagram of the channel bank and sparing scheme according to the teachings of the present invention.

FIG. 3 shows how traffic previously carried on faulty line cards may be rerouted to a spare line card. FIG. 3 shows a channel bank populated with 21 high density network line cards 22 and four spare line cards 52. If line card 60 is detected by high density bank control unit 20 as being defective, then redundancy switch 50 (with two planes thereof shown as RS 54 and RS 56) breaks the network connection to line card 60 and reroutes its traffic to a spare line card 70. When line cards of different functionality are resident in the channel bank, the traffic should be routed to the spare line card with the same functionality as the faulty line card. The traffic from spare line card 70 is then routed to high density bank control unit 20 (to both planes, BCU A 80 and BCU B 82). High density bank control unit 20 allocates the time slots previously occupied by faulty line card 60 to spare line card 70 in the logical mapping on the time slot interchanger link.

If additional line cards 62 and 64 also become faulty, their traffic is similarly rerouted to spare line cards 72 and 74 by redundancy switch 50, and a logical remapping of the time slot interchanger link is similarly performed by high density bank control unit 20. In this manner, up to the same number of line cards as there are available spare line cards may fail and channel bank 10 will still function normally.

Figure 4:
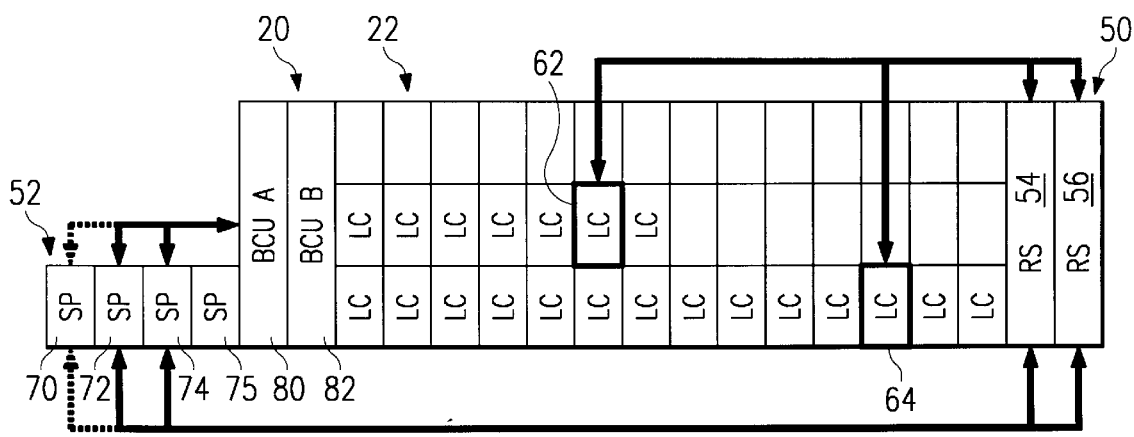
FIG. 4 is a further exemplary block diagram of the channel bank and sparing scheme according to the teachings of the present invention.

Referring to FIG. 4, provisions are available to provide redundancy for faulty spare line cards. In the example shown in FIG. 4, line cards 62 and 64 are first spared by spare line cards 70 and 72. However, spare line card 70 then became defective and required rerouting of the traffic. High density bank control unit 20 instructs redundancy switch 50 to break the network connection to faulty spare line card 70 and route its traffic to another spare line card 74. High density bank control unit 20 then reassigns the time slot occupied by spare line card 70 to spare line card 74. If subsequently spare line card 72 or 74 becomes faulty before faulty line cards 62 and 64 or spare line card 70 can be replaced, its traffic may be rerouted to a spare line card 75. Therefore, as long as a spare line card 52 is available, it may be used to carry traffic of faulty line cards or faulty spare line cards.

Figure 5:
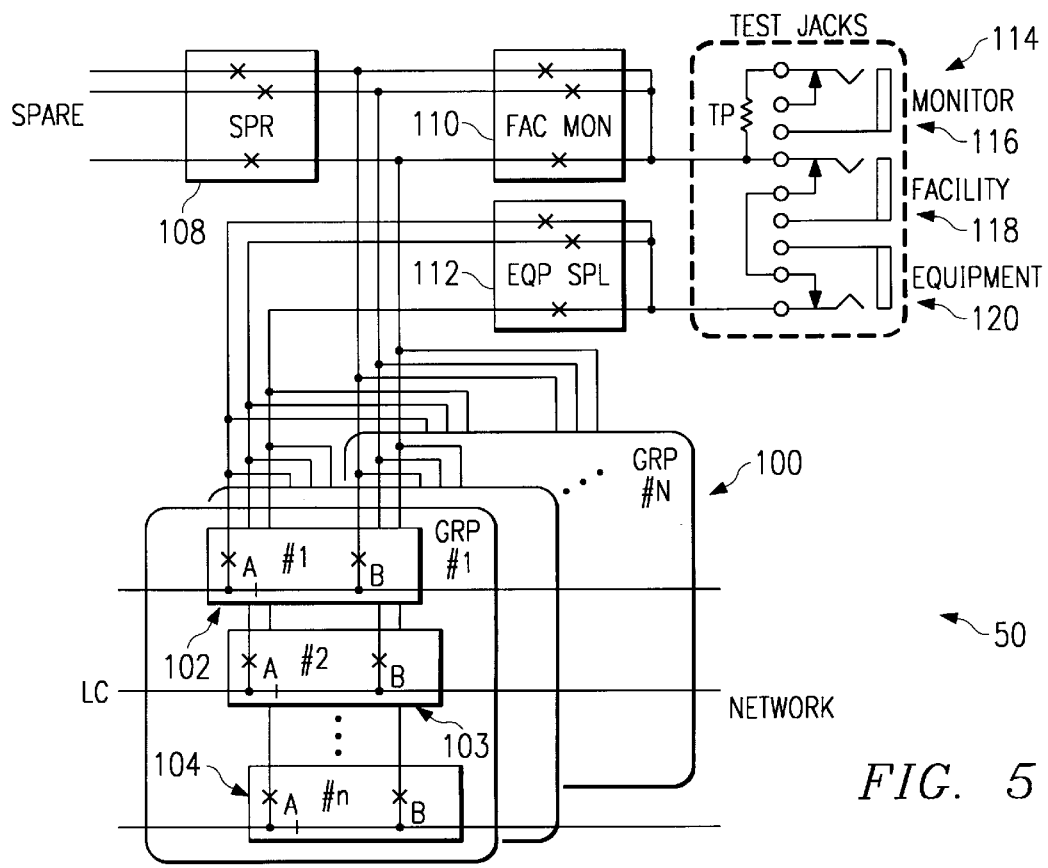
FIG. 5 is a more detailed schematic diagram of an exemplary redundant switch according to the teachings of the present invention.

Referring to FIG. 5, a detailed schematic diagram of an embodiment of redundancy switch 50 according to the teachings of the present invention is shown. Redundancy switch 50 includes network interface circuits 100 which includes N groups of n circuits 102–104, where each group corresponds to one line card and each of n circuits corresponds to one bit of data signal. Each circuit 102–104 of network interface circuits 100 includes two relay switches A and B for breaking the path between the network and the line cards. Relay switches A and B are also hereinafter referred to as circuit-side relays and networkside relays, respectively. Further provided are spare line card selection relays (SPR) 108 for establishing a path between the network and spare line cards. In addition, facility monitor (FAC MON) test relays 110 and equipment split (EQP SPL) testing relays 112 are also provided for monitoring and testing purposes. A test jack 114 includes test jacks 116–120 to provide connection of test equipment to the desire circuit for monitor, facility, and equipment testing. Note that FIG. 5 shows the redundant switch implementation for only one protection group of line cards, and additional circuitry is required to provide the routing circuitry for the remaining protection groups.

Figure 6:
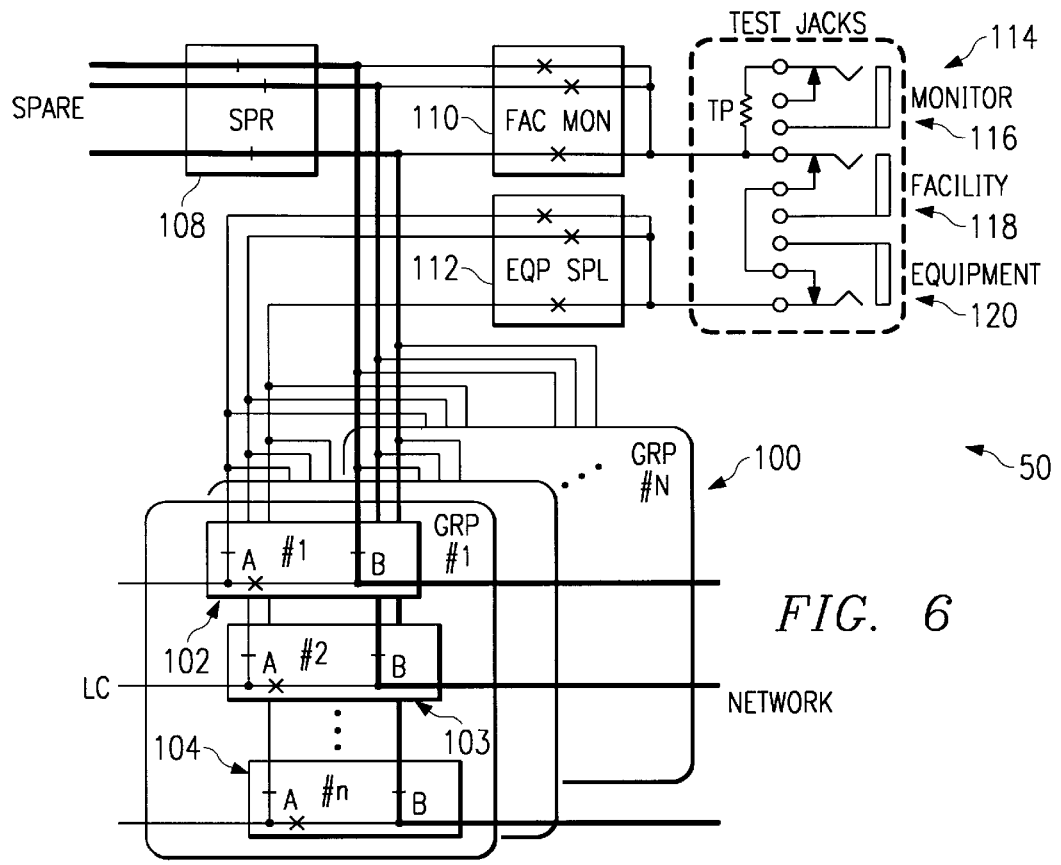
FIG. 6 is a more detailed schematic diagram of an exemplary redundant switch routing traffic through a spare line card according to the teachings of the present invention.

FIG. 6 shows how a spare line card may be used to substitute for a faulty line card. Relay switches A of circuits 102–104 in a group corresponding to the faulty line card is activated to break the normal transmission path, and relay switches B of circuits 102–104 in the same group is activated to establish a transmission path between spare relay 108 and the network. Spare relay 108 is also activated to establish a transmission path to a spare line card. The altered transmission path is shown in bold.

Figure 7:
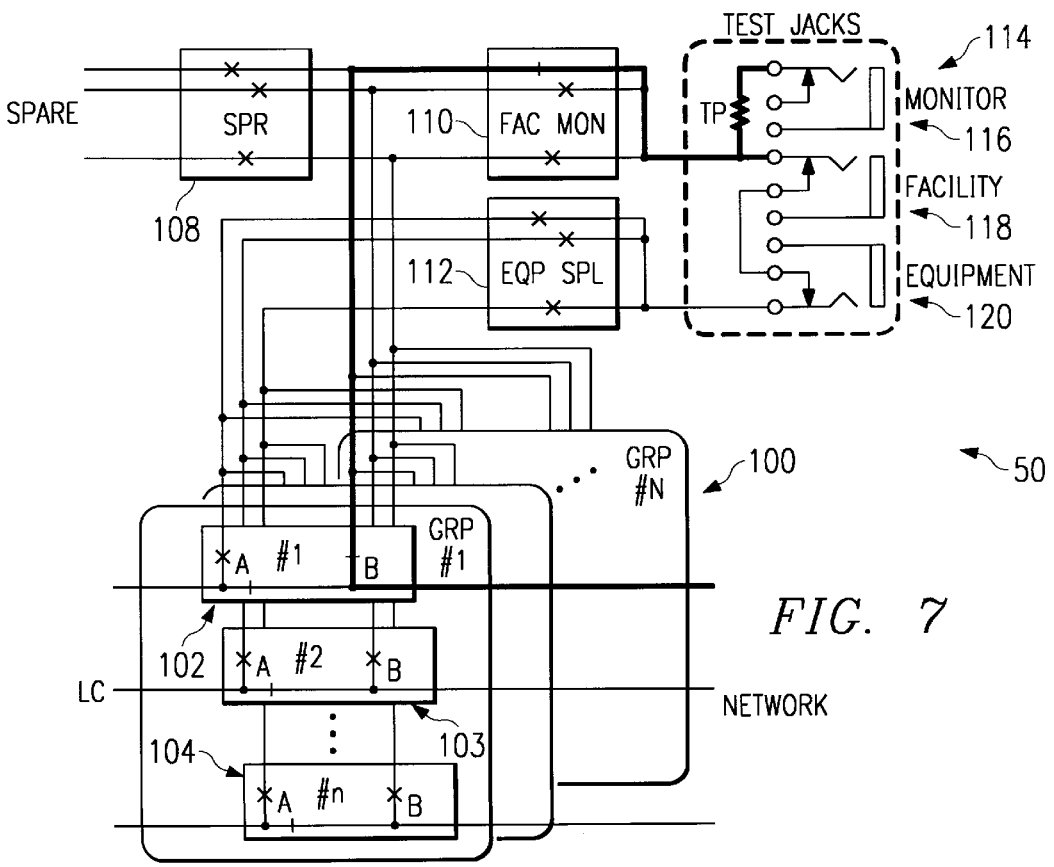
FIG. 7 is a more detailed schematic diagram of an exemplary redundant switch for monitor test access according to the teachings of the present invention.

Redundant switch 50 may also be used to provide monitor test access as shown in FIG. 7. Relay switch B of a particular circuit 102 is activated to form a transmission path to facility monitor test relays 110, and a facility monitor test relay is activated to secure a path to test jack 114. Either monitor test jack 116 or facility test jack 118 nay be used. As shown, monitor test jack 116 may provide a test pad (TP). The resultant transmission path is shown in bold. It may be seen that monitor testing may be performed even when a spare line card is used to provide backup to a faulty line card by merely activating facility monitor test relays 110.

Figure 8:
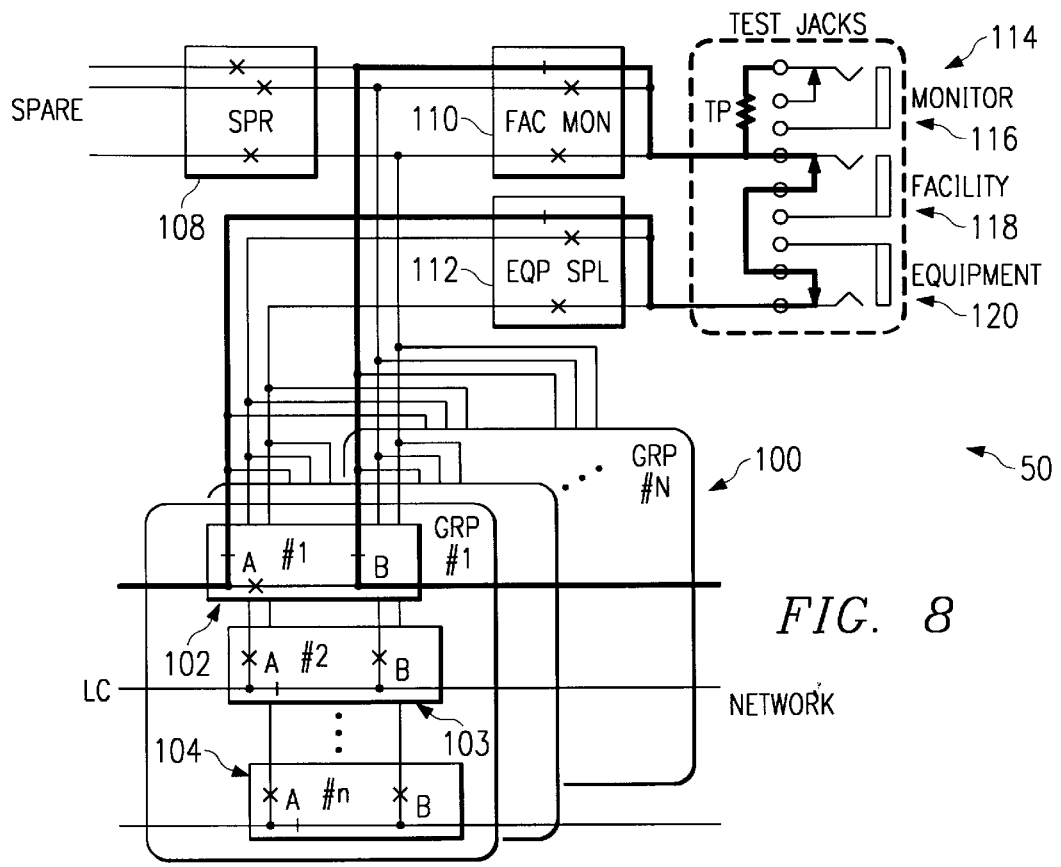
FIG. 8 is a more detailed schematic diagram of an exemplary redundant switch for split test access according to the teachings of the present invention.

Split test access is also available via redundant switch 50, as shown in FIG. 8. Monitor test access is first established as shown in FIG. 7. Thereafter, the correct equipment split test relay 112 is activated to connect test jack 114 to network interface 100. Relay switch A of the appropriate circuit is then activated to break the normal transmission path and provide test access of the line card. The resultant test path is shown in bold. A normal through-transmission path, shown in bold, is provided when test plugs (not shown) are not inserted in either the facility or equipment test jacks 118 and 120. It may be seen that split testing is not permitted during sparing in this embodiment.

Figure 9:
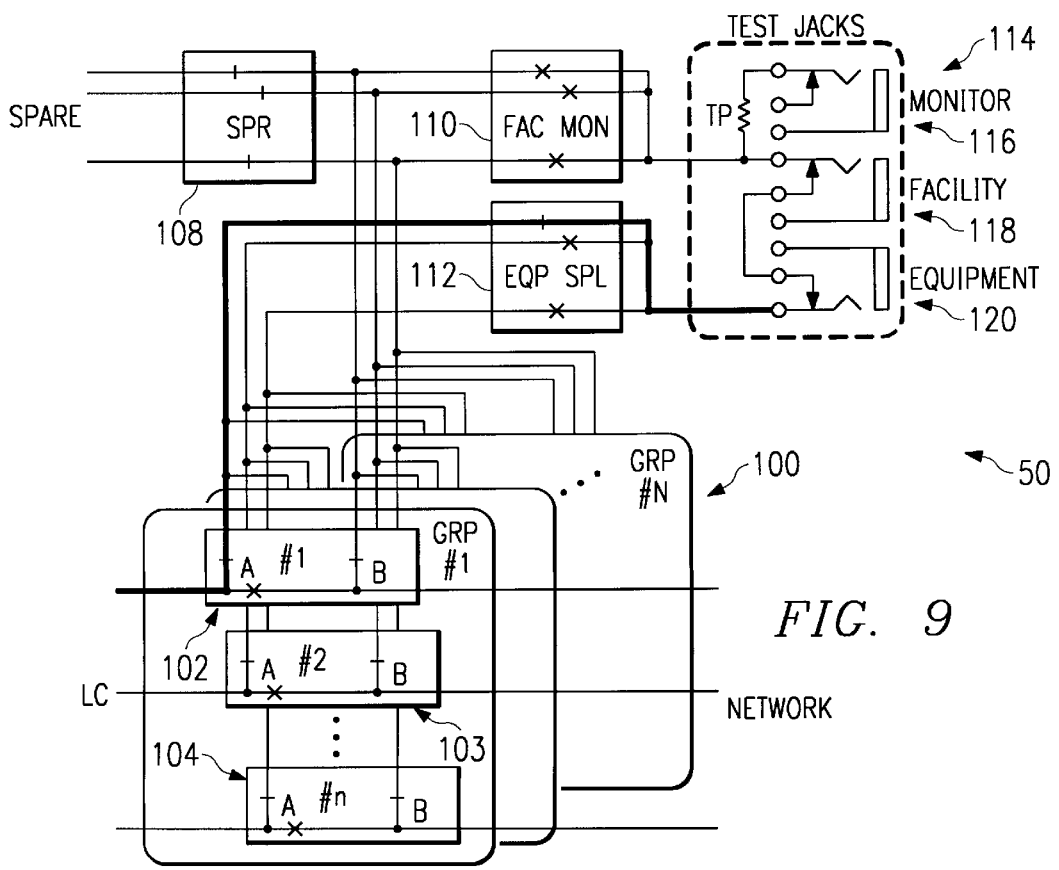
FIG. 9 is a more detailed schematic diagram of an exemplary redundant switch for equipment testing according to the teachings of the present invention.

The functionality of a spared line card may also be tested. A spare line card is first inserted into the transmission path and a line card, faulty or not, is taken out of the path as shown in FIG. 6 and described above. Referring to FIG. 9, the correct equipment split relay 112 is activated to connect equipment jack 120 of test jack 114 to the line card to be tested.

Figure 10:
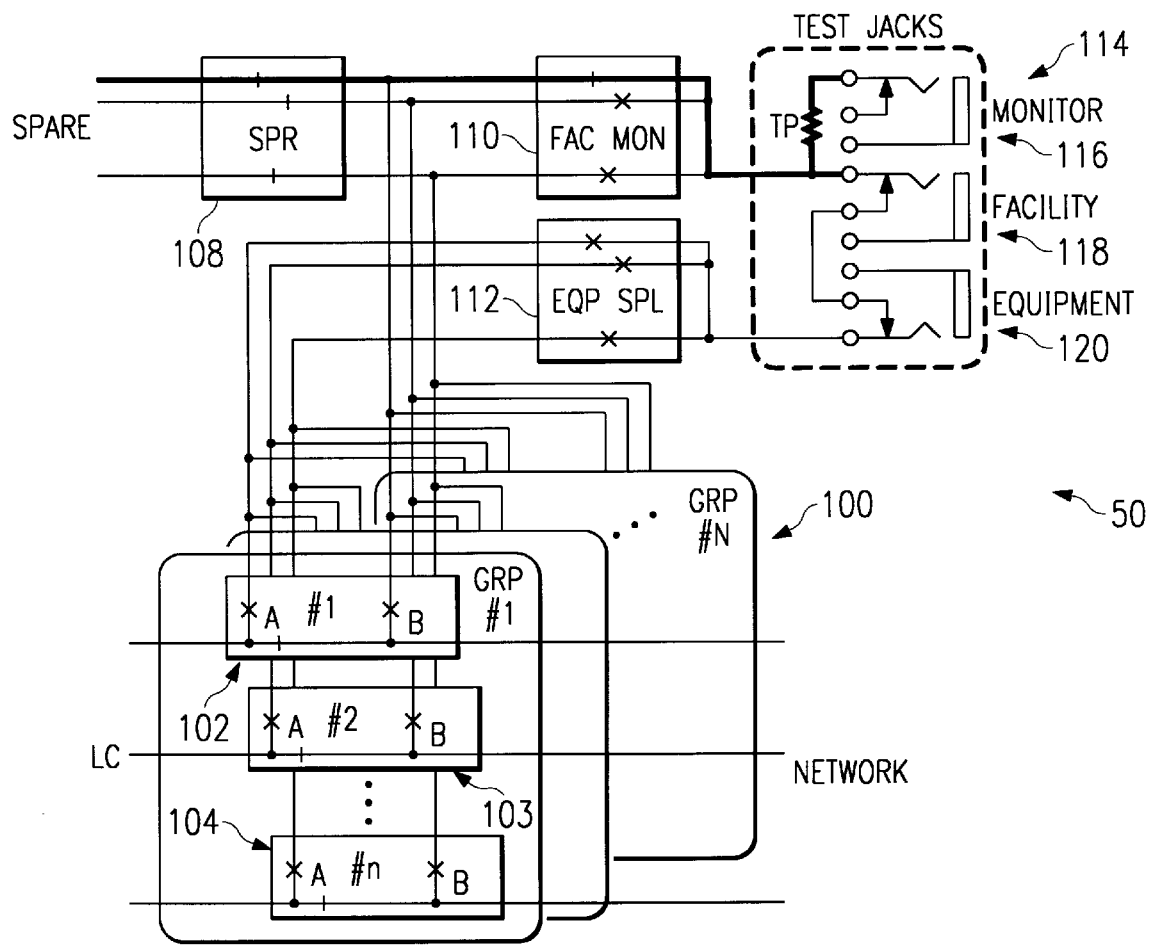
FIG. 10 is a more detailed schematic diagram of an exemplary redundant switch for spare interface testing according to the teachings of the present invention.

In addition, the spare line cards and interface circuits (not shown) may be connected to external user test equipment when not in use, as shown in FIG. 10. The correct facility monitor relay 110 is activated to connect test jack 114 to the spare relay 108. Spare relay 108 is also activated to complete the path to the spare line card.

Constructed in this manner, the traffic carried on faulty line cards may be rerouted to spare line cards by physically rerouting the transmission path using redundancy switch 50 and logically remapping or reallocating the time slot occupied by the faulty line card to the spare line card in the time slot interchanger link. Further, when X spare line cards are provided, up to the same number of line cards may be replaced thereby, and a faulty spare line card that is carrying traffic may be spared by all remaining available spare line cards.

Although the present invention and its advantages have been described in detail, it should be understood that various changes, substitutions and alterations can be made therein without departing from the spirit and scope of the invention as defined by the appended claims.

What is claimed is:

1. Apparatus for redundancy circuit protection, comprising:

a controller;

a plurality of primary circuits coupled to the controller;

a redundancy switch coupled between the plurality of primary circuits and a network, the redundancy switch being adapted for connecting or disconnecting selected ones of the plurality of primary circuits to or from the network; and a predetermined number of spare circuits coupled to the controller and having similar functionality as the plurality of primary circuits the redundancy switch being coupled between the predetermined number of spare circuits and the network, the redundancy switch being adapted for connecting or disconnecting selected ones of the predetermined number of spare circuits to the network.

2. The apparatus, as set forth in claim 1, wherein the redundancy switch comprises network interface relays adapted for connecting or disconnecting selected ones of the plurality of primary circuits to or from the network.

3. The apparatus, as set forth in claim 2, wherein the redundancy switch further comprises spare relays adapted for selectively connecting or disconnecting selected ones of the spare circuits to the network interface relays.

4. The apparatus, as set forth in claim 1, further comprising a test jack.

5. The apparatus, as set forth in claim 1, wherein the redundancy switch further comprises test relays adapted for selectively connecting or disconnecting selected ones of the spare circuits or the plurality of primary circuits to the test jack.

6. The apparatus, as set forth in claim 2, wherein the network interface relays comprise:

circuit-side relays adapted for selectively breaking a connection to selected ones of the plurality of primary circuits; and network-side relays adapted for selectively breaking a connection to the network.

7. The apparatus, as set forth in claim 6, wherein the redundancy switch further comprises a set of spare relays adapted for selectively establishing a connection from selected ones of the spare circuits to the network through the network-side relays.

8. The apparatus, as set forth in claim 6, wherein the redundancy switch further comprises a set of test relays adapted for selectively establishing a connection from selected ones of the plurality of primary circuits to a test jack through the circuit-side relays.

9. The apparatus, as set forth in claim 6, wherein the redundancy switch further comprises a set of test relays adapted for selectively establishing a connection from selected ones of the spare circuits to a test jack.

10. The apparatus, as set forth in claim 6, wherein the redundancy switch further comprises:

a first test relay adapted for connecting selected ones of the spare circuits to a test jack; and a second test relay adapted for connecting selected ones of the plurality of primary circuits to the test jack.

11. The apparatus, as set forth in claim 6, wherein the redundancy switch further comprises a test relay adapted for connecting network signals to a test jack.

12. The apparatus, as set forth in claim 1, wherein the plurality of primary circuits are line cards in a channel bank.

13. A circuit protection scheme, comprises the steps of:

providing multiple spare circuits coupled to a redundancy switch, the redundancy switch connecting selected ones of a plurality of primary circuits to a network in a first position and connecting selected ones of the spare circuits to the network in a second position;

detecting a failure in a primary circuit;

switching the redundant switch to the second position and connecting one of the spare circuits to the network in place of the failed primary circuit;

detecting a failure in another primary circuit;

switching the redundant switch to the second position and connecting another one of the spare circuits to the network in place of the failed primary circuit; and repeating the detecting and switching steps until no spare circuits are available.

14. A circuit protection scheme, comprises the steps of:

providing multiple spare circuits coupled to a redundancy switch, the redundancy switch connecting selected ones of a plurality of primary circuits to a network in a first position and connecting selected ones of the spare circuits to the network in a second position;

detecting a failure in a primary circuit;

switching the redundant switch to the second position and connecting one of the spare circuits to the network in place of the failed primary circuit;

detecting a failure in the spare circuit functioning in place of the failed primary circuit;

switching the redundant switch to the second position and connecting another one of the spare circuits to the network in place of the failed spare circuit; and repeating the detecting and switching steps until no spare circuits are available.

15. A circuit protection scheme, comprises the steps of:

providing multiple spare circuits coupled to a redundancy switch, the redundancy switch connecting a plurality of circuits to a network in a first position and connecting selected ones of the spare circuits to the network in a second position;

detecting a failure in a circuit;

switching the redundant switch to the second position and connecting one of the spare circuits to the network in place of the failed circuit;

detecting a failure in the spare circuit functioning in place of the failed circuit;

switching the redundant switch to the second position and connecting another one of the spare circuits to the network in place of the failed spare circuit;

repeating the detecting and switching steps until no spare circuits are available; and logically remapping a time slot allocated to the failed circuit to the spare circuit functioning in place of the failed circuit.

16. A circuit protection scheme, comprises the steps of:

providing multiple spare circuits coupled to a redundancy switch, the redundancy switch connecting selected ones of a plurality of primary circuits to a network in a first position and connecting selected ones of the spare circuits to the network in a second position;

detecting a failure in a primary circuit;

switching the redundant switch to the second position and connecting one of the spare circuits to the network in place of the failed primary circuit;

detecting a failure in another primary circuit or the spare circuit functioning in place of the failed primary circuit;

switching the redundant switch to the second position and connecting another one of the spare circuits to the network in place of the failed primary circuit or the failed spare circuit; and repeating the detecting and switching steps until no spare circuits are available.

17. A circuit protection scheme, comprises the steps of:

providing multiple spare circuits coupled to a redundancy switch, the redundancy switch connecting a plurality of circuits to a network in a first position and connecting selected ones of the spare circuits to the network in a second position;

detecting a failure in a circuit;

switching the redundant switch to the second position and connecting one of the spare circuits to the network in place of the failed circuit;

detecting a failure in another circuit or the spare circuit functioning in place of the failed circuit;

switching the redundant switch to the second position and connecting another one of the spare circuits to the network in place of the failed circuit or the failed spare circuit; and repeating the detecting and switching steps until no spare circuits are available; and logically remapping a time slot allocated to the failed circuit to the spare circuit functioning in place of the failed circuit.

18. Apparatus for redundancy circuit protection of channel bank line cards, comprising:

a bank unit coupled to a time slot interchanger link;

a plurality of line cards coupled to the bank control unit, the bank control unit mapping traffic transmitted by the plurality of line cards into time slots transported on one or more time slot interchanger link;

a redundancy switch coupled between the plurality of line cards and a network and being adapted for connecting or disconnecting selected ones of the plurality of line cards to or from the network; and a predetermined number of spare line cards having similar functionality as the plurality of line cards being coupled to the bank control unit, the redundancy switch being adapted for disconnecting selected ones of the plurality of line cards from the network and connecting selected ones of the predetermined number of spare line cards to the network and establishing a transmission path from the bank control unit through the selected spare line cards to the network, and the channel bank unit mapping the traffic now transmitted by the selected ones of the spare line card onto the time slots of the time slot interchanger link previously allocated to the disconnected selected line cards.

19. The apparatus, as set forth in claim 18, wherein the redundancy switch comprises network interface relays adapted for connecting or disconnecting selected ones of the plurality of line cards to or from the network.

20. The apparatus, as set forth in claim 19, wherein the redundancy switch further comprises spare relays adapted for selectively connecting or disconnecting selected ones of the spare line cards to the network interface relays.

21. The apparatus, as set forth in claim 18, further comprising a test jack.

22. The apparatus, as set forth in claim 21, wherein the redundancy switch further comprises test relays adapted for selectively connecting or disconnecting selected ones of the spare line cards or the plurality of line cards to the test jack.

23. The apparatus, as set forth in claim 19, wherein the network interface relays comprise:

circuit-side relays adapted for selectively breaking a connection to selected ones of the plurality of line cards; and network-side relays adapted for selectively breaking a connection to the network.

24. The apparatus, as set forth in claim 23, wherein the redundancy switch further comprises a set of spare relays adapted for selectively establishing a connection from selected ones of the spare line cards to the network through the network-side relays.

25. The apparatus, as set forth in claim 23, wherein the redundancy switch further comprises a set of test relays adapted for selectively establishing a connection from selected ones of the plurality of line cards to a test jack through the circuit-side relays.

26. The apparatus, as set forth in claim 23, wherein the redundancy switch further comprises a set of test relays adapted for selectively establishing a connection from selected ones of the spare line cards to a test jack.

27. The apparatus, as set forth in claim 23, wherein the redundancy switch further comprises:

a first test relay adapted for connecting selected ones of the spare line cards to a test jack; and a second test relay adapted for connecting selected ones of the plurality of line cards to the test jack.

28. The apparatus, as set forth in claim 23, wherein the redundancy switch further comprises a test relay adapted for connecting network signals to a test jack.

* * * * *